May 19, 1959  G. HOPPE ET AL  2,887,411
METHOD OF PRODUCING SELENIUM RECTIFIERS
Filed May 29, 1956  2 Sheets-Sheet 1

Inventors:
Georg Hoppe
Erich Nitsche

Fig. 6

| Formation of nickel selenide 23 upon the carrier plate 1, consisting of steel 21 with nickel plating 22 |

| Depositing the selenium layer 24 with halogen addition |

| Crystallizing the layer 24 by heat treatment |

| Depositing the selenium layer 25 with thallium addition (if desired also with halogen addition) in amorphous condition |

| Placing the cover electrode 26 upon the still amorphous selenium layer 25 |

| Converting both selenium layers 24 and 25, particularly the still amorphous selenium layer 25, into best conducting crystalline condition and forming the barrier layer, by the usual thermal and electrical forming treatments. |

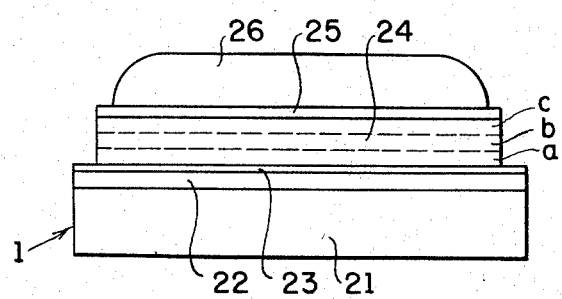

Fig. 5

United States Patent Office 2,887,411
Patented May 19, 1959

2,887,411

METHOD OF PRODUCING SELENIUM RECTIFIERS

Georg Hoppe and Erich Nitsche, Berlin-Siemensstadt, Germany, assignors to Siemens-Schuckertwerke Aktiengesellschaft, Berlin-Siemensstadt, Germany, a corporation of Germany Application May 29, 1956, Serial No. 588,111

Claims priority, application Germany June 7, 1955

28 Claims. (Cl. 117—200)

Our invention relates to the production of dry rectifiers comprising a semiconducting layer of selenium, and is based upon the method disclosed in the copending application of E. Nitsche, Serial No. 571,306, filed March 13, 1956, for Method for Producing Selenium Rectifiers, assigned to the assignee of the present invention.

According to the fundamentals of that method, a dry rectifier cell is made up of a plurality of selenium layers between the base electrode or back plate at which no barrier effect is to occur and the counter electrode adjacent to which the barrier layer is formed. One or more of the selenium layers adjacent to the back plate electrode are given an addition of halogen such a chlorine, and one or more of the selenium layers adjacent to the counter electrode are given in addition of other substance for increasing the reverse resistance of the rectifier, such substance being thallium or another element having the character of the substances in group IIIB of the periodic system of elements and being added either alone or together with a halogen addition. For example, a rectifier made according to this method may be made by first converting the surface of a nickel-plated base electrode of sheet steel into nickel selenide to prevent the subsequent formation of a barrier layer at this surface, then depositing upon the back plate a first layer of selenium which contains .02% by weight of chlorine, then coating the first selenium layer with a second selenium layer which contains .02% chlorine and .05% of thallium, then coating the second selenium layer with a third layer of selenium containing .02% chlorine and .10% thallium, and then depositing upon the last selenium layer a counter electrode of a cadmium-tin-bismuth alloy, whereafter the sandwich structure is subjected to heating to convert the totality of selenium layers into a crystalline body and to form a barrier layer between the counter electrode and the next adjacent selenium substance. A rectifier cell thus produced combines increased forward conductance with increased reverse resistance.

It is an object of our invention to further improve such manufacturing methods toward obtaining still better rectifying qualities as well as a better temperature stability of the selenium rectifiers.

When working with methods as outlined above, we made the discovery that such improvements are achieved if the penultimate selenium layer is first converted into a certain crystalline state before depositing thereupon the ultimate selenium layer that subsequently is to coact with the counter electrode in forming the barrier layer, this crystalline state being obtained by a thermal pre-forming treatment at a temperature between 110 and 150° C., preferably at about 125° C., for a period of about 5 to 55 minutes.

According to our invention, therefore, we proceed as follows. We first coat a back, i.e. carrier, plate, for instance of aluminum or nickel-plated steel, with a layer of selenium which contains a slight addition of halogen, namely one or more of chlorine, fluorine, bromine or iodine. The amount of added halogen is in the order of a controlled impurity and, as a rule, should be within the approximate limits of 0.01 to 0.05% by weight. The deposition of this layer, as well as of the subsequent selenium layers, is preferably effected by precipitation from the vaporous phase as will be more fully described below.

After deposition of the first selenium layer, one or more selenium layers are added in the same manner. These other layers may also contain a halogen addition within the above-mentioned limits. As a rule, however, the halogen content in the subsequent layers is diminished as compared with the amount used in the first layer and no halogen need be added to the ultimate layer that, during subsequent fabrication, will be directly adjacent to the counter electrode.

We further add to the ultimate layer a slight amount of substance, such as thallium, gallium, indium, tellurium, arsenic or sulphur, which increases the blocking or barrier resistance. Preferably used is thallium. The amount of the substance added to the ultimate selenium layer is likewise in the order of a controlled impurity and should remain within the approximate limits of 0.01 to 0.10% by weight. An amount of thallium or other barrier-resistance increasing substance may also be added to the penultimate or other preceding layers excepting the first one, but the respective amounts should decrease from the ultimate toward the first layer. For instance, the first selenium layer may contain only chlorine, the ultimate layer only thallium, and any intermediate layer both substances in graduated amounts.

Now, according to our invention, it is essential and critical for the method that before the ultimate selenium layer is deposited, the penultimate or all previously deposited layers are first crystallized by subjecting them to a temperature of 110° to 150° C. The heating time needed depends upon the particular composition and the specific temperature and was found to be more than five minutes but not more than fifty-five minutes. For instance, with chlorine and thallium additions, a period of approximately thirty minutes at about 125° C. is sufficient.

After such pre-crystallization treatment, we deposit the ultimate selenium layer in amorphous condition. The thickness of the amorphous layer last deposited is kept about 1 to 2 orders of magnitude larger than the so-called intermediate reaction layer which, during further processing of the rectifier, is subsequently formed of the cadmium of the counter electrode and the selenium of the semiconductor body and whose thickness is known to be about 0.1 to 1 micron. After the amorphous last selenium layer is applied, the cover electrode is deposited. The completed rectifier sandwich structure is then subjected to the usual thermal and electrical forming treatments which have the purpose of converting the entire semiconductor body into the best conducting modification and to promote the formation of the barrier layer to obtain optimum conductance of the rectifier cell in the forward direction as well as the desired optimum in peak inverse voltage, and also for minimizing or preventing the occurrence of aging phenomena during the subsequent use of the cell.

We believe the effect of the method according to the invention can be explained physically as follows:

According to modern views, the processing of selenium rectifiers during their manufacture leads to the formation of the so-called intermediate reaction layer between the counter electrode and the semiconductor body, this reaction layer consisting of a compound of selenium with metal contained in the counter electrode, for instance with cadmium, if the counter electrode consists of a tin-cadmium or tin-cadmium-bismuth alloy. In coaction with the selenium semiconductor body, the intermediate reaction layer is the cause of the barrier properties of the rectifier. The coaction of the reaction layer with the selenium semiconductor is promoted by building thallium atoms, or atoms of other substance possessing the character of the elements from the group IIIB of the periodic system, into the selenium in the vicinity of the transition between the intermediate reaction layer and the selenium semiconductor. However, while thus improving the barrier effect useful for rectifier operation, thallium also has the detrimental property that, if it penetrates in appreciable quantities into the selenium semiconductor, the resistance of the semiconductor is reduced thus impairing the forward conductance of the rectifier. We believe that the tendency of thallium or equivalent atoms to diffuse into a selenium layer is considerably smaller if this layer is already crystallized, and we think that this is the phenomenon utilized by the present invention. Since according to the method of the invention the thallium-containing selenium is deposited upon the preceding layer only after that layer is already crystallized, the diffusion of the thallium into the crystallized thallium-free or thallium-poor selenium layer is slowed down to such an extent that no noticeable reduction in the conductance of this layer can occur up to the time when the thallium is consumed during the further processing, particularly during the formation of the intermediate reaction layer. The originally amorphous condition of the ultimate selenium layer closest to the barrier layer, on the other hand, facilitates the desired diffusion of the thallium in the direction toward the outer surface of this ultimate layer when the intermediate reaction layer is being formed at this location.

The penultimate selenium layer, onto which the last semiconductor layer adjacent to the subsequently formed barrier layer is deposited, is preferably produced by the usual evaporation method. In this case, the penultimate layer can be converted into the desired crystalline state directly during the evaporation process by maintaining during evaporation and precipitation the preceding selenium surface at a corresponding temperature.

The invention affords the production of selenium rectifiers of considerably higher temperature stability than heretofore obtainable, so that the rectifiers in continuous operation will satisfactorily withstand a higher operating temperature without detrimental aging. Tests have shown, for instance, that rectifiers made in accordance with the methods heretofore customary have a temperature stability up to 75° C., whereas rectifiers made according to the present invention have a temperature stability of 110° C.

We have further found that the quality of the rectifiers can be improved by converting the penultimate selenium layer into the desired crystalline condition by subjecting this layer to heat radiation preferably immediately after deposition of the layer. For this purpose, radiation in the range of wave length from about 0.7 to about 7 microns has been found particularly favorable. The advantageous effect of such radiation is probably due to the fact that it involves a direct effect in depth within the layer to be crystallized, whereas with other heating methods the heat penetrates only slowly into the depth of the layer because of the slight heat conductance of selenium.

The method can be performed, for instance, by placing the individual selenium-coated back plates first into the active range of a selenium vaporizing device and thereafter into the range of a heat radiator which acts thermally upon the layer just precipitated. When using a continuous conveyor device for the back plates of the rectifier cells to be produced, a number of vaporizing devices and heat radiators may be disposed spaced from one another along the conveying direction of the conveyor device. The layer of the semiconductor to be crystallized before applying the last selenium layer may also be deposited in form of several coatings. For that purpose, several vaporizing devices and heat radiators are used in alternating relation along the conveying path of the coated plates. Each of these coatings can then be thermally processed into the desired crystalline state either directly after deposition of the individual coating or only after all coatings are deposited. If desired, several heat radiators of different respective intensities may act sequentially upon the individual coatings or upon the entire deposited amount of selenium.

The holding or conveying device for the back plates to be selenium coated may be given the design of a conveyor belt, a rotating table, or a rotating drum and is preferably kept in motion relative to the stationary vaporizing devices and heat radiators. Two embodiments of devices for performing the method according to the invention are schematically illustrated on the drawing in which—

Fig. 5 illustrates the multi-layered rectifier device produced; and

Fig. 6 is a block diagram illustrating the sequence of steps of the process.

Figure 1:
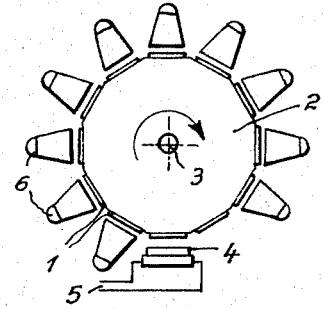
Fig. 1 is an axial view of a processing device with a drum type conveyor mechanism.

According to Fig. 1, the carrier or back plates 1 of the rectifier cells to be produced are mounted on a drum structure 2 which, during processing, is kept in rotation on its shaft 3. Disposed beneath the drum structure is a vaporizing device 4 which consists of an upwardly open container or boat and has an electric heater energized through leads 5 for evaporating the selenium so that it precipitates upon the rectifier plates. Heat radiators 6 are stationarily mounted about the drum structure 2 to direct radiation toward the back plates 1.

Figure 2:
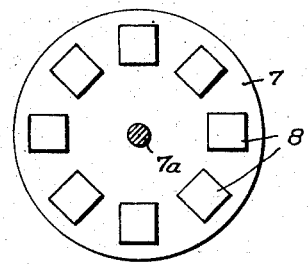
Fig. 2 is a partly sectional bottom view of another processing device with a table-type rotary conveyor, the section being along the line II—II in Fig. 3.
Figure 3:
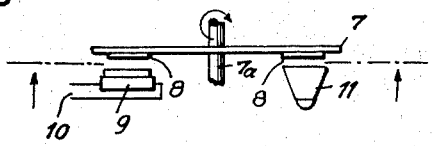
Fig. 3 is a side view, and Fig. 4 a bottom view of the same device.
Figure 4:
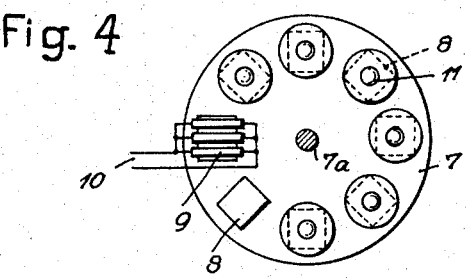

In the embodiment according to Figs. 2, 3 and 4, a supporting disc 7 or table rotates on a vertical shaft 7a. The back plates 8 of the rectifier cells to be produced are mounted on the bottom surface of disc 7. Disposed beneath the disc 7 is a vaporizing device 9 for the selenium to be precipitateed onto the plates. The electric heating device of the selenium container is energized through electric leads 10. A number of heat radiators 11 are disposed on a circle about the shaft 7a and are directed upwardly toward the disc 7. The apparatus can be so designed that each individual conveyor disc, or a group of such discs, is located within a processing chamber which is separated from a similar adjacent chamber by a partition. The individual chambers can be provided with a suitable atmosphere of desired pressure, or subjected to vacuum pressure, or filled with a protective, chemically inert gas.

The vapor-coating devices and the thermal processing devices according to the invention may also be located along the path of a continuous fabricating line in which the rectifier cells are provided with the counter electrodes and are subsequently subjected to thermoelectrical forming treatment.

According to a further feature of the invention, the vaporization-coating of at least the penultimate selenium layer is effected within a chamber in which a partial pressure of the semiconductor substance of approximately $1.10^{-1}$ to $4.10^{-1}$ mm. Hg is maintained together with a vaporous atmosphere of a substance promoting the crystallization of the semiconductor layer, this vaporous atmosphere having a partial pressure in the order of magnitude from about $10^{-5}$ to $10^{-6}$ mm. Hg. Such crystallization promoting substances for the purposes of the invention are, for instance, mineral oil, tricresylphosphate, or chlorinated diphenyl such as the substance available under the trade name Clophen.

It has been found that the crystallization of the vaporization-coated selenium layer within an atmosphere of such a crystallization promoting substance produces a so-called "fiber texture" of the selenium, namely a preferred crystal orientation perpendicular to the surface receiving the coating. We have further found that when we subsequently precipitate upon the crystallized selenium layer the ultimate selenium coating in amorphous condition and subsequently subject the rectifier sandwich to crystallization, the originally amorphous ultimate layer also crystallizes in form of a fiber texture regardless of whether or not the vaporization and the precipitation of the ultimate layer occurs in the presence of a crystallization promoting atmosphere. This phenomenon is probably explainable by the presence of crystallization germs on the pre-crystallized penultimate layer. As a whole, this embodiment of the method according to the invention results in a particularly uniformly grown, entirely crystallized selenium body which therefore is also capable, in coaction with the material of the counter electrode, to form a particularly uniform and faultless intermediate reaction layer.

According to the above-mentioned copending application, Serial No. 571,306, the subsequent production of the intermediate reaction layer is facilitated by depositing the ultimate selenium layer with a thickness between 3 to $5.10^{-4}$ cm. and to provide it with an addition of thallium of, for instance, $5.10^{-6}$ grams per cm.$^2$ barrier-layer area. The same layer thickness and thallium content is also applicable in a method according to the present invention. With such a thallium addition we have found it favorable to keep the vapor pressure of the crystallization promoting substance, for instance of the above-mentioned mineral oil, between approximately $10^{-6}$ and $10^{-5}$ mm. Hg. In principle, when increasing the quantity of the additional substance, such as thallium, the partial vapor pressure of the crystallization promoting substance, such as the mineral oil, is to be lowered; and conversely, when reducing the amount of additional substance, the partial vapor pressure of the crystallization promoter is to be increased.

The mentioned slight vapor pressures of the crystallization promoter within the processing chamber in which the semiconductor layer is deposited by evaporation can be obtained by keeping one or more surfaces in the chamber wetted with oil. For instance, the processing vessel itself may have its inner surface entirely or partly wetted with a thin layer of oil. Instead, separate containers with oil may be disposed within the processing chamber. In the latter case it is preferable to give the exposed vaporization surface of the oil level a correspondingly small size so that only very slight amounts of oil contribute to the formation of the vapor. The oil containers may also be so designed that the vaporization surface is adjustable. The formation of the oil vapor, in general, will take place under the effect of the temperature obtaining in the vaporization chamber. However, if more clearly defined conditions are to be established, the oil containers are preferably subjected to an accurately determinable heating. The vaporization vessel may be utilized for supplying the heat because the processing vessel assumes and maintains a certain and rather constant temperature during the vaporization process. For instance, we found it useful to connect the oil container by heat-conductive bridges with the wall of the processing vessel. In this manner, when the vessel has a normal operating temperature of about 60° C., the desired partial pressure of the oil vapor of approximately $10^{-6}$ mm. Hg in the vaporization chamber is obtained without additional heating devices. However, the oil container may also be provided with its own heating device, preferably under control by a thermostat, and the oil container may then be prevented from receiving heat of conduction from the vaporization vessel by separating and heat-insulating the oil container from the vessel with the aid of insulating inserts.

In principle, it is sufficient for the purposes of the invention if only the penultimate selenium layer is deposited in the presence of a vaporous atmosphere of mineral oil or other crystallization promoting substance. If such an atmosphere were to be avoided when subsequently precipitating the ultimate selenium layer, the selenium coated rectifier plate would first have to be placed into a different vaporization vessel because, as we have found, the oil precipitates onto the walls of the vaporization vessel, so that when the same vaporization vessel is used for subsequently precipitating the ultimate selenium layer, the presence of an oil atmosphere cannot be avoided, although such atmosphere is not needed for the vapor-deposition of the ultimate selenium layer. However, we have also found that the presence of an oil atmosphere during the vaporization coating of the ultimate selenium layer does not impair the properties of the finished rectifier. The presence of such atmosphere may rather have the advantage of promoting the uniform and orderly crystallization of the ultimate layer during the subsequent processing steps that convert the selenium body into best-conductive modification. For that reason, all semiconductor layers may be deposited upon the rectifier plate directly after each other within one and the same vaporization vessel. The foregoing phenomena described with reference to the use of oil vapor as a crystallization promoter also apply to the other crystallization promoters mentioned in the foregoing.

Methods according to the invention afford the production of selenium rectifiers which exhibit a differential resistance in the order of magnitude of 1.5 ohm cm.$^2$ and a blocking voltage of approximately 40 volts at a current density of 1 ma./cm.$^2$.

Described in the following and summarized in Fig. 6 is an example of a method according to the invention involving the production of the semiconductor body from two selenium layers, one containing a halogen addition and the other a thallium addition.

Carrier or back plates 1, of nickel-plated steel, are dusted with selenium powder and are then heated for about five to ten minutes at 300° C. This converts the surface of the back plate into nickel selenide. Thereafter, the back plates are mounted on a device as illustrated in Figs. 1 and 2 with the nickel selenide surface facing outwardly. The device with the back plates mounted thereon is then placed into a vacuum chamber. Placed onto the bottom of the chamber is a container or boat filled with mineral oil as described above. Preferably an oil surface area of about 200 cm.$^2$ per m.$^3$ volume of the processing chamber is used. The quantity of the mineral oil is not essential, a level in the oil container of 1 cm. above the bottom is amply satisfactory. Also placed into the vacuum chamber are two containers for the evaporation of selenium substance. These containers are placed in the vicinity of the plate-carrying drum as illustrated in Fig. 1 for the container 4. Each container is electrically heatable individually, also as described above. The first container is charged with selenium which contains an addition of 0.02% chlorine. The second container is charged with selenium containing an addition of 0.10% thallium. The quantities of the selenium in the respective containers are such that the content of the first container, when completely evaporated, produces a selenium coating of approximately $40 \times 10^{-4}$ cm. thickness, and the content of the second container produces a selenium coating of about 3 to $5 \times 10^{-4}$ cm. The selenium quantities required for this purpose depend upon the size of the surface to be coated. Due to the losses of selenium substance occurring during the evaporation process, and depending upon the geometric data of the vaporization vessel, the quantities of selenium substance in the respective containers are kept somewhat larger, the additional quantity being in the order of about 10%.

The processing vessel is evacuated down to a pressure of approximately $10^{-4}$ mm. Hg; and the walls of the processing vessel are heated to a temperature of approximately 60° C. This temperature is maintained during the entire period of the subsequent processing. The plate-carrying drum of the device is likewise heated by electric heaters (not illustrated) behind the back plates so that the plates assume a temperature of approximately 125° C. prior to commencing the evaporation of the selenium. After the mentioned pressure and temperature conditions are reached, the first selenium container is electrically heated to a temperature of approximately 300° C. During evaporation of the selenium, the drum is kept in rotation at constant speed, and the evaporation is continued until the entire content of the first container is evaporated. This produces a chlorine-containing coating of selenium of the above-mentioned approximate thickness upon each plate.

After the first selenium layer is precipitated, the radiators (6 in Fig. 1) are energized, the drum being kept in continuous rotation. The radiators are kept in operation for a period of approximately thirty minutes. With a wave length of radiation between 0.7 and 7 microns, the selenium is heated down to its entire depth with the result that the selenium layer is converted into the desired crystalline condition.

Upon completion of the irradiating treatment, the temperature of the back plate is lowered to approximately 100° C. Thereafter the second selenium container is electrically heated to about 300° C. until its entire content is evaporated. In this manner, a second, amorphous thallium-containing selenium layer of the above-mentioned thickness is produced.

After completion of the second selenium layer, the drum device with the back plates is taken out of the processing vessel, and a cadmium-tin-bismuth alloy is sprayed onto the coated plates to produce a counter electrode. The completed sandwich cells are then subjected to the thermal and electric forming processes as generally used for selenium rectifiers.

Fig. 5 illustrates the relative positions of the individual layers in the rectifier element. Denoted by 21 is the carrier plate of the rectifier, which is provided with a nickel plating 22. On the surface of the nickel coating 22 is a nickel-selenide layer 23, produced by reaction with selenium. Deposited upon the nickel-selenide layer 23 is a selenium layer 24 containing a halogen addition, which layer 24 may consist of several layers or layer sections *a*, *b* and *c*. Layer *c* is the penultimately deposited selenium layer. Following the layer 24 is another selenium layer 25, which contains the means for promoting the formation of the barrier layer, for example a thallium addition. Layer 25 is the ultimately deposited selenium layer. The layer 25 may additionally contain a determined amount of halogen. The so built-up layers are covered by a cover electrode 26.

We claim:

1. In the method of producing dry rectifier cells composed of a back plate, a selenium semiconductor body and a counter electrode, which comprises successively depositing on the back plate a plurality of superposed selenium layers of which at least the first one nearest the back plate contains a halogen addition and at least the ultimate one closest to the counter electrode and to the ultimately formed barrier layer contains an added barrier-resistance promoter, the steps of subjecting the selenium deposition to crystallization after deposition of the penultimate selenium layer, thereafter depositing the ultimate selenium layer in amorphous form and thereafter the counter-electrode material, and thereafter subjecting the resulting sandwich structure to barrier layer forming and crystallization treatment.

2. In the method of producing dry rectifier cells composed of a back plate, a selenium semiconductor body and a counter electrode, which comprises successively depositing on the back plate a plurality of superposed selenium layers of which at least the first one nearest the back plate contains a halogen addition, the ultimate one closest to the counter electrode and to the ultimately formed barrier layer containing an added barrier-resistance promoter, the steps of subjecting the selenium after deposition of the penultimate selenium layer to a temperature between about 110° and about 150° C. for a period of time sufficient to crystallize the deposited selenium, then depositing the barrier-resistance promoter-containing ultimate selenium layer in amorphous condition, then depositing the counter-electrode material on the amorphous layer and subjecting the resulting sandwich structure to selenium crystallizing and barrier layer formation treatment.

3. In the method of producing dry rectifier cells composed of a back plate, an intermediate selenium semiconductor body and a counter electrode on said body, which comprises coating the back plate with a first layer of selenium containing about 0.01% to about 0.05% halogen, the first selenium layer being the one closest to the back plate, coating the said first layer with at least one subsequent layer of selenium, the said subsequent layer or layers containing a smaller amount of halogen, heating the selenium, after deposition of the penultimately deposited selenium layer, to a temperature between about 110° and about 150° C. for a period of time sufficient to crystallize the deposited selenium, then depositing the ultimate selenium layer in amorphous condition, said ultimate layer containing about 0.01% to about 0.10% of substance from group IIIB of the periodic system of elements, then depositing the counter-electrode material and subjecting the resulting sandwich structure to selenium crystallizing and barrier layer formation treatment.

4. In the method of producing dry rectifier cells composed of a back plate, an intermediate selenium semiconductor body and a counter electrode on said body, which comprises coating the back plate with a first layer of selenium containing about 0.01% to about 0.05% chlorine, the first selenium layer being the one closest to the back plate, coating the first layer with at least one other layer of selenium further removed from the back plate, heating the selenium after deposition of the penultimately deposited selenium layer to a temperature between about 110° and about 150° C. for a period of time sufficient to crystallize the deposited selenium, then depositing the ultimate selenium layer in amorphous condition, said ultimate layer being that one of the selenium layers that is farthest removed from the back plate and containing about 0.01% to about 0.10% thallium, then depositing the counter-electrode material and subjecting the resulting sandwich structure to selenium crystallizing formation treatment.

5. In the method according to claim 4, the steps of depositing the selenium layers by evaporation from stationary evaporation containers, and maintaining the back plates in motion past said containers and past the source of said radiation.

6. In the method according to claim 4, the steps of depositing each selenium layer by passing the back plate through the effective range of an evaporation container, and subjecting each layer to heating by radiation immediately after deposition of the layer and before deposition of the next selenium layer.

7. In the method of producing dry rectifier cells composed of a back plate, an intermediate selenium semiconductor body and a counter electrode on said body, which comprises successively depositing on the back plate a plurality of superposed selenium layers of which at least the first one deposited contains a halogen addition and at least the ultimate one deposited contains an added barrier-resistance promoter, the steps of subjecting the selenium after deposition of the penultimately deposited layer to heat radiation directed toward said penultimately deposited layer and having at said layer a temperature between about 110° to about 150° C. for converting the selenium into crystalline state, thereafter depositing the ultimate selenium layer in amorphous condition onto the crystallized penultimate layer, then depositing the counter-electrode material onto the amorphous layer and subjecting the resulting sandwich structure to selenium crystallizing formation treatment.

8. In the method of producing dry rectifier cells composed of a back plate, an intermediate selenium semiconductor body and a counter electrode on said body, which comprises coating the back plate with a first layer of selenium containing about 0.01% to about 0.05% halogen, the first selenium layer being the one closest to the back plate, coating the first layer with at least one subsequent layer of selenium, the subsequently deposited selenium layer or layers containing a smaller amount of halogen, subjecting the selenium after deposition of the penultimately deposited selenium layer to radiation of a wave length between about 0.7 to 7 microns at a selenium temperature of about 110° to about 150° C. until the deposited selenium is crystallized, then depositing thereon an ultimate amorphous selenium layer containing about 0.01% to about 0.10% barrier-resistance promoting substance, the ultimate selenium layer being the selenium layer closest to the counter electrode and to the ultimately formed barrier layer, depositing the counter-electrode material and subjecting the resulting sandwich structure to selenium crystallizing formation treatment.

9. Apparatus for producing crystallized selenium rectifier cells, comprising a rotatable carrier structure having peripherally arranged means for mounting a series of back plates, a plurality of individually heatable selenium vaporizing containers stationarily disposed near said mounting means for successively evaporating respective selenium quantities to precipitate successive selenium layers upon said back plates during rotation of said carrier, and heat radiators disposed along the path of rotation of said mounting means for heating at least one of said layers during rotation of said carrier.

10. Apparatus according to claim 9, comprising a sealed and heatable vacuum vessel in which said carrier, containers and radiators are located, and another container for crystallization promoter substance located within said vessel, said latter container being heat-insulated from said vessel and having separate heating means for evaporating said liquid substance.

11. Apparatus according to claim 9, comprising a sealed and heatable vacuum vessel in which said carrier, containers and radiators are located, and another container for crystallization promoter substance located within said vessel, and heat-conductive means thermally joining said latter container with said vessel for evaporating said substance by heat from said vessel.

12. A method of making a selenium dry rectifier cell, which cell comprises a back plate, an intermediate selenium semiconductor body and a cadmium-containing counter electrode on said body, the selenium body being formed from a number of superposed layers disposed on the back plate, the method comprising forming a layer of selenium containing a halogen addition, thereafter forming an ultimate selenium layer containing thallium as barrier-resistance promoter, the ultimate layer being of amorphous selenium, a penultimate selenium layer being crystalline, the ultimate selenium layer being the selenium layer closest to the counter electrode and to the ultimately formed barrier layer, the penultimate layer being adjacent the ultimate layer, then disposing the cadmium-containing counter electrode on the amorphous layer and subjecting the resulting sandwish structure to selenium crystallizing and barrier layer formation treatment.

13. A method of producing dry rectifier cells composed of a back plate, an intermediate selenium semiconductor body and a cadmium-containing counter electrode on said body, which comprises successively depositing on the back plate a plurality of superposed selenium layers of which at least an anterior one contains a halogen addition, the ultimate one containing thallium as barrier-resistance promoter, subjecting the selenium after deposition of a penultimate selenium layer to a crystallization treatment, the ultimate selenium layer being the selenium layer closest to the counter electrode and to the ulti- mately formed barrier layer, the penultimate layer being adjacent the ultimate layer, then depositing the thallium-containing ultimate selenium layer in amorphous condition, then disposing the cadmium-containing counter electrode on the amorphous layer and subjecting the resulting sandwich structure to selenium crystallizing and barrier layer formation treatment.

14. A method of producing dry rectifier cells composed of a back plate, an intermediate selenium semiconductor body and a cadmium-containing counter electrode, which comprises successively depositing on the back plate a plurality of selenium layers of which at least an anterior one contains a halogen addition, the ultimate one containing thallium as barrier-resistance promoter, subjecting the selenium after deposition of a penultimate selenium layer to a temperature between about 110° and about 150° C. for a period of time sufficient to crystallize the deposited selenium, then depositing the thallium-containing ultimate selenium layer in amorphous condition, the ultimate selenium layer being the selenium layer closest to the counter electrode and to the ultimately formed barrier layer, the penultimate layer being adjacent the ultimate layer, then depositing the cadmium-containing counter-electrode material on the amorphous layer and subjecting the resulting sandwich structure to selenium crystallizing and barrier layer formation treatment.

15. A method of producing dry rectifier cells composed of a back plate, an intermediate selenium semiconductor body and a cadmium-containing counter electrode, which comprises successively depositing on the back plate a plurality of selenium layers of which at least an anterior one contains a halogen addition, the ultimate one containing thallium as barrier-resistance promoter, subjecting the selenium after deposition of a penultimate selenium layer to a crystallization treatment, said treatment being by penetrative radiant heat, then depositing the thallium-containing ultimate selenium layer in amorphous condition, the ultimate selenium layer being the selenium layer closest to the counter electrode and to the ultimately formed barrier layer, the penultimate layer being adjacent the ultimate layer, then disposing the cadmium-containing counter electrode on the amorphous layer and subjecting the resulting sandwich structure to selenium crystallizing and barrier layer formation treatment.

16. A method of making a selenium dry rectifier cell, which cell comprises a back plate, an intermediate selenium semiconductor body and a cadmium-containing counter electrode, the selenium body being formed from a number of layers disposed on the back plate, the method comprising forming a layer of selenium containing a halogen addition, thereafter forming an ultimate selenium layer containing a member of the group consisting of thallium, gallium, indium, tellurium, arsenic and sulphur as barrier-resistance promoter, the ultimate layer being of amorphous selenium, a penultimate selenium layer being crystalline, the ultimate selenium layer being the selenium layer closest to the counter electrode and to the ultimately formed barrier layer, the penultimate layer being adjacent the ultimate layer, then disposing the cadmium-containing counter electrode on the amorphous layer and subjecting the resulting sandwich structure to selenium crystallizing and barrier layer formation treatment.

17. A method of making a selenium dry rectifier cell, which cell comprises a back plate, an intermediate selenium semiconductor body and a cadmium-containing counter electrode, the selenium body being formed from a number of layers disposed on the back plate, the method comprising forming a layer of selenium containing chlorine, thereafter forming an ultimate selenium layer containing thallium as barrier-resistance promoter, the ultimate layer being of amorphous selenium, a penultimate selenium layer being crystalline, the ultimate selenium layer being the selenium layer closest to the counter electrode and to the ultimately formed barrier layer, the penultimate layer being adjacent the ultimate layer, then disposing the cadmium-containing counter electrode on the amorphous layer and subjecting the resulting sandwich structure to selenium crystallizing and barrier layer formation treatment.

18. In the method of producing dry rectifier cells composed of a back plate, an intermediate selenium semiconductor body and a cadmium-containing counter electrode on said body, which comprises coating the back plate with a first layer of selenium containing about 0.01% to about 0.05% chlorine, coating the first layer with at least one other layer of selenium, heating the selenium after deposition of the penultimate selenium layer to a temperature between about 110° and about 150° C. for a period of time sufficient to crystallize the deposited selenium, then depositing the ultimate selenium layer in amorphous condition, said ultimate layer containing about 0.01% to about 0.10% thallium, the ultimate selenium layer being the selenium layer closest to the counter electrode and to the ultimately formed barrier layer, the penultimate layer being adjacent the ultimate layer, then depositing the cadmium-containing counter-electrode material and subjecting the resulting sandwich structure to selenium crystallizing and barrier layer formation treatment.

19. A method of producing dry rectifier cells composed of a ferrous back plate, an intermediate selenium semiconductor body and a cadmium-containing counter electrode, which comprises coating the back plate with a first layer of selenium containing about 0.01% to about 0.05% chlorine, coating the first layer with at least one other layer of selenium, the subsequent layers having a halogen content ranging from zero to a smaller amount of halogen than the first layer, subjecting the selenium after deposition of a penultimate layer to penetrative heat radiation at a selenium temperature of about 110° to about 150° C. until the deposited selenium is crystallized, then depositing an ultimate layer of amorphous selenium containing about 0.01% to about 0.10% of thallium as barrier-resistance promoting substance, the ultimate selenium layer being the selenium layer closest to the counter electrode and to the ultimately formed barrier layer, the penultimate layer being adjacent the ultimate layer, depositing the cadmium-containing counter-electrode material and subjecting the resulting sandwich structure to selenium crystallizing and barrier layer formation treatment.

20. A method of producing a dry rectifier cell composed of a back plate, an intermediate selenium semiconductor body, and a counter electrode, which comprises successively depositing on the back plate, by vaporization deposition of selenium, a plurality of selenium layers of which at least an anterior one contains a halogen addition and the ultimate one contains an added barrier-resistance promoter, maintaining during the vaporization deposition of a penultimate layer a partial selenium vapor pressure of about $1 \times 10^{-1}$ to $4 \times 10^{-1}$ mm. Hg and a partial vapor pressure of a crystallization promoter substance in the order of magnitude of $10^{-5}$ to $10^{-6}$ Hg, the penultimate layer being crystalline selenium, the said ultimate layer being amorphous selenium and being formed by evaporation in an atmosphere containing said barrier-resistance promoter, the ultimate selenium layer being the selenium layer closest to the counter electrode and to the ultimately formed barrier layer, the penultimate layer being adjacent the ultimate layer, disposing the counter electrode on the amorphous layer, and subjecting the resulting sandwich structure to selenium crystallizing and barrier layer forming treatment.

21. The method according to claim 20, comprising the step of providing in the vaporization chamber, prior to vaporization, a surface wetted by said crystallization promoter substance.

22. The method according to claim 20, comprising the steps of depositing the selenium layers within a vaporization vessel, and wetting the inner vessel surface at least partially with said crystallization promoter substance.

23. The method according to claim 20, comprising the steps of depositing the selenium layers within a vaporization vessel, providing in said vessel an open container which contains said barrier-resistance promoter substance in liquid form, and heating said container during vapor-deposition of at least the ultimate selenium layer to evaporate part of said liquid substance.

24. A method of producing a dry rectifier cell composed of a back plate, an intermediate selenium semiconductor body, and a counter electrode on said body, which comprises successively depositing on the back plate, by vaporization deposition of selenium, a plurality of selenium layers of which at least an anterior one contains a halogen addition and the ultimate one contains an added barrier-resistance promoter, maintaining during the vaporization deposition of a penultimate layer a partial selenium vapor pressure of about $1 \times 10^{-1}$ to $4 \times 10^{-1}$ mm. Hg and a partial vapor pressure of a crystallization promoter substance in the order of magnitude of $10^{-5}$ to $10^{-6}$ Hg, the crystallization promoter substance being mineral oil, the penultimate layer being crystalline selenium, the said ultimate layer being amorphous selenium and being formed by evaporation in an atmosphere containing said barrier-resistance promoter, the ultimate selenium layer being the selenium layer closest to the counter electrode and to the ultimately formed barrier layer, the penultimate layer being adjacent the ultimate layer, disposing the counter electrode on the amorphous layer, and subjecting the resulting sandwich structure to selenium crystallizing and barrier layer forming treatment.

25. A method of producing a dry rectifier cell composed of a back plate, an intermediate selenium semiconductor body, and a cadmium-containing counter electrode, which comprises successively depositing on the back plate, by vaporization deposition of selenium, a plurality of selenium layers of which at least an anterior one contains a halogen addition and the ultimate one contains an added barrier-resistance promoter, maintaining during the vaporization deposition of a penultimate layer a partial selenium vapor pressure of about $1 \times 10^{-1}$ to $4 \times 10^{-1}$ mm. Hg and a partial vapor pressure of a crystallization promoter substance in the order of magnitude of $10^{-5}$ to $10^{-6}$ Hg, the crystallization promoter substance being mineral oil, the penultimate layer being crystalline selenium, the said ultimate layer being amorphous selenium and being formed by evaporation in an atmosphere containing said barrier-resistance promoter, the ultimate selenium layer being the selenium layer closest to the counter electrode and to the ultimately formed barrier layer, the penultimate layer being adjacent the ultimate layer, disposing the cadmium-containing counter electrode on the amorphous layer, and subjecting the resulting sandwich structure to selenium crystallizing and barrier layer forming treatment.

26. In the method of producing dry rectifier cells composed of a back plate, an intermediate selenium semiconductor body and a cadmium-containing counter electrode on said body, which comprises successively depositing on the back plate a plurality of selenium layers of which at least an anterior one contains a halogen addition and at least the ultimate one contains an added barrier-resistance promoter, the steps of subjecting the selenium deposition to crystallization after deposition of a penultimate selenium layer but before deposition of the ultimate selenium, the ultimate selenium layer being the selenium layer closest to the counter electrode and to the ultimately formed barrier layer, the penultimate layer being adjacent the ultimate layer, depositing the ultimate selenium layer in amorphous form by evaporation in an atmosphere containing thallium as barrier resistance promoter substance, the barrier resistance promoting addition to the ultimately deposited selenium being at least about 0.01% but not more than about $5 \times 10^{-6}$ gram per cm.² of the layer area, maintaining during vapor-deposition of the ultimate selenium layer a partial selenium vapor pressure of about $1 \times 10^{-1}$ to $4 \times 10^{-1}$ mm. Hg and a partial vapor pressure of said barrier resistance promoter substance of at least about $10^{-5}$ mm. Hg but smaller than said selenium vapor pressure, forming a sandwich with the cadmium-containing counter electrode, and subjecting the sandwich to selenium crystallization and barrier-resistance forming treatment.

27. A method of producing a barrier-layer dry rectifier cell composed of a back plate, an intermediate selenium semiconductor body, and a counter electrode, which comprises successively depositing on the back plate, by vaporization deposition of selenium, a plurality of selenium layers of which at least an anterior one contains a halogen addition and the ultimate one contains thallium as barrier-resistance promoter in an amount of less than $5 \times 10^{-6}$ grams per square centimeter of barrier layer area, maintaining during the vaporization deposition of a penultimate layer a partial selenium vapor pressure of about $1 \times 10^{-1}$ to $4 \times 10^{-1}$ mm. Hg and a partial vapor pressure of mineral oil vapor, as crystallization promoter substance, in the order of magnitude of $10^{-5}$ to $10^{-6}$ Hg, the penultimate layer being crystalline selenium, the ultimate selenium layer being the selenium layer closest to the counter electrode and to the ultimately formed barrier layer, the penultimate layer being adjacent the ultimate layer, the said ultimate layer being amorphous selenium and being deposited in vapor phase in an atmosphere containing said barrier-resistance promoter and mineral vapor of a partial vapor pressure of said order of magnitude, the ultimate layer having a thickness of 3 to $5 \times 10^{-4}$ cm., disposing the counter electrode on the amorphous layer, and subjecting the resulting sandwich structure to selenium crystallizing and barrier layer forming treatment.

28. The process of claim 27, the counter electrode containing cadmium.

References Cited in the file of this patent
UNITED STATES PATENTS

| | | |
|---|---|---|
| 2,124,306 | Osawa | July 19, 1938 |
| 2,279,746 | Thompson et al. | Apr. 14, 1942 |
| 2,334,554 | Hewlett | Nov. 16, 1943 |
| 2,390,771 | Blackburn | Dec. 11, 1945 |
| 2,392,744 | Kallmeyer | Jan. 8, 1946 |
| 2,453,763 | Smith | Nov. 16, 1948 |